US010514865B2

(12) United States Patent
Bassov et al.

(10) Patent No.: US 10,514,865 B2
(45) Date of Patent: Dec. 24, 2019

(54) MANAGING CONCURRENT I/O OPERATIONS

(71) Applicant: EMC IP Holding Company LLC, Hopkinton, MA (US)

(72) Inventors: Ivan Bassov, Brookline, MA (US); Hao Fang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/960,806

(22) Filed: Apr. 24, 2018

(65) Prior Publication Data

US 2019/0324687 A1 Oct. 24, 2019

(51) Int. Cl.
*G06F 3/06* (2006.01)
*G06F 12/0804* (2016.01)

(52) U.S. Cl.
CPC ............ *G06F 3/0659* (2013.01); *G06F 3/061* (2013.01); *G06F 3/067* (2013.01); *G06F 3/0643* (2013.01); *G06F 12/0804* (2013.01); *G06F 2212/1016* (2013.01); *G06F 2212/608* (2013.01)

(58) Field of Classification Search
None
See application file for complete search history.

(56) References Cited

U.S. PATENT DOCUMENTS

| | | | | |
|---|---|---|---|---|
| 6,658,533 B1 * | 12/2003 | Bogin et al. | ............ | G06F 12/00 711/135 |
| 8,793,532 B1 * | 7/2014 | Tsai et al. | ............... | G06F 11/00 714/6.32 |
| 9,213,717 B1 * | 12/2015 | Pawar et al. | ...... | G06F 17/30171 |
| 2003/0120869 A1 * | 6/2003 | Lee et al. | ................ | G06F 12/00 711/135 |
| 2004/0088336 A1 * | 5/2004 | Pasupathy | ............... | G06F 12/00 707/205 |
| 2005/0005070 A1 * | 1/2005 | Lam | ........................ | G06F 12/08 711/135 |
| 2005/0066095 A1 * | 3/2005 | Mullick et al. | ......... | G06F 12/14 710/200 |
| 2011/0078393 A1 * | 3/2011 | Lin | ......................... | G06F 12/00 711/155 |
| 2011/0197022 A1 * | 8/2011 | Green et al. | ............ | G06F 12/00 711/112 |
| 2013/0262746 A1 * | 10/2013 | Srinvasan | ............... | G06F 12/02 711/103 |
| 2015/0293701 A1 * | 10/2015 | Kim et al. | .............. | G06F 3/061 |
| 2017/0017588 A1 * | 1/2017 | Frid et al. | ............... | G06F 13/18 |
| 2017/0075824 A1 * | 3/2017 | Haen et al. | ......... | G06F 12/1425 |
| 2017/0123685 A1 * | 5/2017 | Zuo et al. | ............. | G06F 3/0611 |
| 2018/0089082 A1 * | 3/2018 | Jakowski et al. | ... | G06F 12/0808 |

* cited by examiner

*Primary Examiner* — Eric Cardwell
(74) *Attorney, Agent, or Firm* — Muirhead and Saturnelli, LLC

(57) ABSTRACT

Techniques for a managing concurrent I/Os in a file system may include receiving a sequence of conflicting I/O lists of write data stored in a cache, the sequence specifying a sequential order in which the I/O lists are to be flushed to a file stored on non-volatile storage; determining a first I/O list of the sequence having a conflict with a second I/O list of the sequence, wherein the conflict between the first I/O list and the second I/O list is a first common block written to by both the first and second I/O lists; and performing first processing that modifies the first I/O list and the second I/O list to remove the conflict.

16 Claims, 9 Drawing Sheets

MANAGING CONCURRENT I/O OPERATIONS

BACKGROUND

Technical Field

This application generally relates to concurrent I/O (input/output) operations.

Description of Related Art

Systems may include different resources used by one or more host processors. Resources and host processors in the system may be interconnected by one or more communication connections, such as network connections. These resources may include, for example, data storage devices such as those included in the data storage systems manufactured by Dell Inc. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may issue I/O operations, such as data read and write operations, received at a data storage system. Host systems may store and retrieve data by issuing the I/O operations to the data storage system containing a plurality of host interface units, disk drives (or more generally storage devices), and disk interface units. Such data storage systems are provided, for example, by Dell Inc. The host systems access the storage devices through a plurality of channels provided therewith. Host systems provide data and access control information through the channels to a storage device of the data storage system and data of the storage device is also provided from the data storage system to the host systems also through the channels. The host systems do not address the disk drives of the data storage system directly, but rather, access what appears to the host systems as a plurality of files, objects, logical units, logical devices or logical volumes. Thus, the I/O operations issued by the host may be directed to a particular storage entity, such as a file or logical device. The logical devices may or may not correspond to the actual physical drives. Allowing multiple host systems to access the single data storage system allows the host systems to share data stored therein.

SUMMARY OF THE INVENTION

In accordance with one aspect of the techniques herein is a method of managing concurrent I/Os in a file system comprising: receiving a sequence including a plurality of I/O lists of write data stored in a cache, wherein each I/O list of the sequence conflicts with at least one other I/O list of the sequence, where the sequence specifies a sequential order in which the plurality of I/O lists are to be flushed to a file stored on non-volatile storage; determining a first I/O list of the sequence having a first conflict with a second I/O list of the sequence, wherein the first I/O list includes write data of a first write and the second I/O list includes data of a second write, and wherein the first conflict between the first I/O list and the second I/O list is a first common block included in both the first I/O list and the second list, and wherein data is written by both the first write and the second write to the first common block; and performing first processing that modifies the first I/O list and the second I/O list to remove the first conflict. The first processing may be performed while each of the first and second I/O lists are waiting for at least one other I/O list to be flushed, to the file stored on the non-volatile storage, prior to commencing flushing of said each I/O list. A third I/O list of the sequence may conflict with the first I/O list, the third I/O list may include write data of a third write, and the first I/O list may wait for the third I/O list to complete flushing to the file stored on non-volatile storage prior to commencing flushing of the first I/O list. The second I/O list may wait for the first I/O list to complete flushing to the file stored on non-volatile storage prior to commencing flushing of the second list. The first write may be received prior to the second write, and the third may be received prior to the first write, and wherein the sequential order of the sequence may indicate sequentially flushing the third I/O list, the first I/O list and then the second I/O list. The second I/O list may include a first data value written to the first common block, and said first processing may include: eliminating the first common block from a plurality of blocks written to by the second I/O list; and merging the first data value written to the first common block from the second I/O list with the first I/O list. The first I/O list may include a second data value written to the first common block, and wherein merging may include overwriting the second data value with the first data value in the first I/O list. The method may include determining whether a client is waiting for a commit that the second I/O list, or any portion thereof has been flushed to the file stored on non-volatile storage; and responsive to determining the client is not waiting for a commit that the second I/O list, or any portion thereof, has been flushed to the file stored on non-volatile storage, determining to perform said first processing, and otherwise determining not to perform said second processing. After performing said first processing whereby the first conflict between the first I/O list and the second I/O list is removed, and wherein the second I/O list does not conflict with the third I/O list, the method may further include concurrently flushing the second I/O list and the third I/O list to the file stored on the non-volatile storage. The second I/O list maybe flushed to the file stored on the non-volatile storage in parallel with flushing the third I/O list to the file stored on the non-volatile storage. Each of the first write and the second write may be either an asynchronous or a synchronous write request issued by a client.

In accordance with another aspect of techniques herein is a system comprising: at least one processor; and a memory comprising code stored thereon that, when executed, performs a method of managing concurrent I/Os in a file system comprising: receiving a sequence including a plurality of I/O lists of write data stored in a cache, wherein each I/O list of the sequence conflicts with at least one other I/O list of the sequence, where the sequence specifies a sequential order in which the plurality of I/O lists are to be flushed to a file stored on non-volatile storage; determining a first I/O list of the sequence having a first conflict with a second I/O list of the sequence, wherein the first I/O list includes write data of a first write and the second I/O list includes data of a second write, and wherein the first conflict between the first I/O list and the second I/O list is a first common block included in both the first I/O list and the second list, and wherein data is written by both the first write and the second write to the first common block; and performing first processing that modifies the first I/O list and the second I/O list to remove the first conflict.

In accordance with another aspect of techniques is a computer readable medium comprising code stored thereon that, when executed, performs a method of managing concurrent I/Os in a file system comprising: receiving a sequence including a plurality of I/O lists of write data stored in a cache, wherein each I/O list of the sequence conflicts with at least one other I/O list of the sequence, where the sequence specifies a sequential order in which the plurality of I/O lists are to be flushed to a file stored on non-volatile storage; determining a first I/O list of the sequence having a first conflict with a second I/O list of the sequence, wherein the first I/O list includes write data of a first write and the second I/O list includes data of a second write, and wherein the first conflict between the first I/O list and the second I/O list is a first common block included in both the first I/O list and the second list, and wherein data is written by both the first write and the second write to the first common block; and performing first processing that modifies the first I/O list and the second I/O list to remove the first conflict. The first processing may be performed while each of the first and second I/O lists are waiting for at least one other I/O list to be flushed, to the file stored on the non-volatile storage, prior to commencing flushing of said each I/O list. A third I/O list of the sequence may conflict with the first I/O list, the third may I/O list include write data of a third write, and the first I/O list may wait for the third I/O list to complete flushing to the file stored on non-volatile storage prior to commencing flushing of the first I/O list. The second I/O list may wait for the first I/O list to complete flushing to the file stored on non-volatile storage prior to commencing flushing of the second list. The first write may be received prior to the second write, and the third may be received prior to the first write, and wherein the sequential order of the sequence may indicate sequentially flushing the third I/O list, the first I/O list and then the second I/O list. The second I/O list may include a first data value written to the first common block, and said first processing may include eliminating the first common block from a plurality of blocks written to by the second I/O list; and merging the first data value written to the first common block from the second I/O list with the first I/O list. The first I/O list may include a second data value written to the first common block, and wherein said merging may include overwriting the second data value with the first data value in the first I/O list. After performing said first processing whereby the first conflict between the first I/O list and the second I/O list is removed, and wherein the second I/O list does not conflict with the third I/O list, the method further include concurrently flushing the second I/O list and the third I/O list to the file stored on the non-volatile storage.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
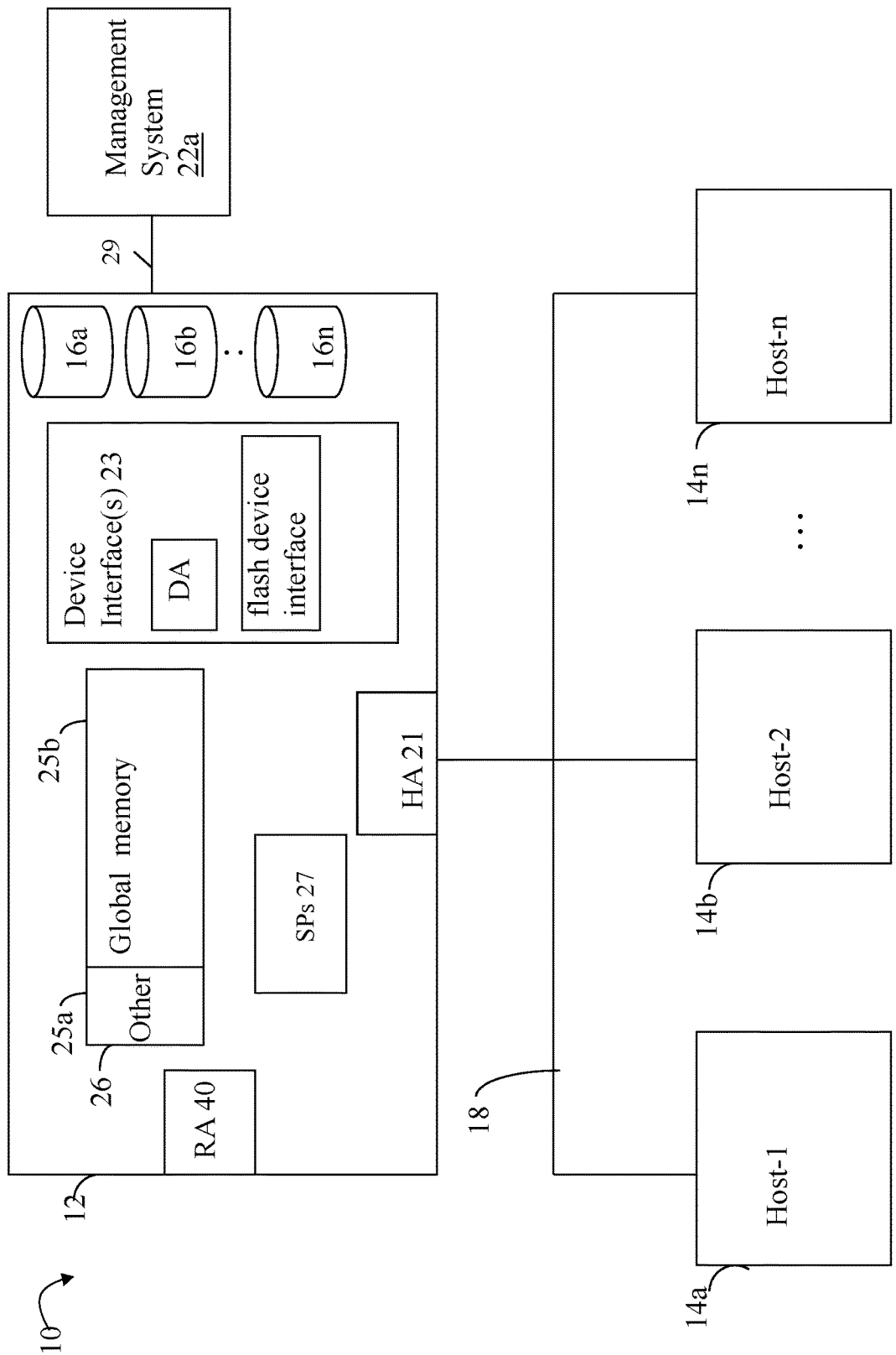
FIG. 1 is an example of components that may be included in a system in accordance with techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as block-based protocols (e.g., SCSI, Fibre Channel, iSCSI), file system-based protocols (e.g., NFS), and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment may include data storage arrays or other components from one or more vendors. In subsequent examples illustrated the techniques herein, reference may be made to a single data storage array by a vendor, such as by Dell Inc. However, as will be appreciated by those skilled in the art, the techniques herein are applicable for use with other data storage arrays by other vendors and with other components than as described herein for purposes of example.

The data storage system 12 may be a data storage appliance or a data storage array including a plurality of data storage devices 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving mechanical parts. The flash devices may be constructed using nonvolatile semiconductor NAND flash memory. The flash devices may include one or more SLC (single level cell) devices and/or MLC (multi level cell) devices.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a system cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

It should be noted that although examples of techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Also shown in FIG. 1 is a management system 22a that may be used to manage and monitor the system 12. In one embodiment, the management system 22a may be a computer system which includes data storage system management software or application such as may execute in a web browser. A data storage system manager may, for example, view information about a current data storage configuration such as LUNs, storage pools, and the like, on a user interface (UI) in a display device of the management system 22a. Alternatively, and more generally, the management software may execute on any suitable processor in any suitable system. For example, the data storage system management software may execute on a processor of the data storage system 12.

It should be noted that each of the different adapters, such as HA 21, DA or disk interface, RA, and the like, may be implemented as a hardware component including, for example, one or more processors, one or more forms of memory, and the like. Code may be stored in one or more of the memories of the component for performing processing.

The device interface, such as a DA, performs I/O operations on a physical device or drive 16a-16n. In the following description, data residing on a LUN may be accessed by the device interface following a data request in connection with I/O operations. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of FIG. 1 may be a data storage system, such as the Dell EMC Unity® data storage system by Dell Inc., that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, memory 26 may represent memory of each such storage processor.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data stored on a data storage system, and also receiving a response (possibly including requested data) in connection such I/O commands (e.g., returning requested read data).

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to FIG. 1, the control commands may be issued from data storage management software executing on management system 22a to the data storage system 12. Such commands may be, for example, to establish or modify data services, provision storage, perform user account management, and the like. For example, commands may be issued over the control path to provision storage for LUNs, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data path and control path define two sets of different logical flow paths. In at least some of the data storage system configurations, at least part of the hardware and network connections used for each of the data path and control path may differ. For example, although both control path and data path may generally use a network for communications, some of the hardware and software used may differ. For example, with reference to FIG. 1, a data storage system may have a separate physical connection 29 from a management system 22a to the data storage system 12 being managed whereby control commands may be issued over such a physical connection 29. However, it may be that user I/O commands are never issued over such a physical connection 29 provided solely for purposes of connecting the management system to the data storage system. In any case, the data path and control path each define two separate logical flow paths.

The DA physically accesses the back-end non-volatile storage devices, such as physical data storage devices (PDs) 16a-n. Data residing on a PD may be accessed by the DA following a data request in connection with I/O operations that other directors originate. In at least one embodiment, write data received at the data storage system from a host or other client may be initially written to cache memory (e.g., such as may be included in the component designated as 25b) and marked as write pending (WP). At a later point time, the write data (e.g., WP data) may be destaged or flushed from cache to the PDs accessed by a DA. In connection with reads, processing may include first looking to see if the requested read data is in cache whereby a read hit occurs. For a read hit, the read is serviced using the cached copy of the requested read data by returned the cached read data to the requester. Thus, with a read hit, there is no need to access the physical (back end) non-volatile storage by the DA to obtain the requested read data thereby resulting in a faster read I/O response time. If the requested read data is not in cache, the requested read data is obtained from the physical (back end) non-volatile storage by the DA where the read data is then stored in the cache, and returned to the requester. The cached copy of the read data may then be available to further service any other subsequent reads.

As known in the art, any suitable cache management techniques may be used to maintain the cache, for example, such as is determining how long data remains in cache, whether to prefetch data, selecting data stored in the cache for eviction, and the like.

In at least one embodiment in accordance with techniques herein, the data storage system may support one or more file system protocols such that a host or other client may send file-based I/O requests in accordance with such supported protocols. For example, in at least one embodiment, supported file system protocols may include CIFS (common internet file system), NFS (network file system), and the like. Such an embodiment may support file system protocols alone, or in combination with other block-based protocols, such as iSCSI. As described in U.S. Pat. No. 9,213,717, MANAGING CONCURRENT I/Os IN FILE SYSTEMS, issued Dec. 15, 2015, Pawar et al., (the '717 patent) which is incorporated by reference herein, techniques are described using such file-based protocols as noted above where concurrent I/Os are allowed to different logical block ranges of the same file and different types of access needed to such ranges may be synchronized using range locks. Such I/Os may include asynchronous I/Os and also synchronous I/Os where write data of such I/Os may be cached. In at least one embodiment, write data of an asynchronous write I/O may be stored in cache, such as used for file system caching, and an acknowledgement regarding completion of the write may be returned to the host or client issuing the write once the write data is stored in cache and marked as WP as noted above. At a later point in time, the WP data is flushed or destaged from cache to non-volatile storage. Thus, for asynchronous writes, once the WP data is written to cache, the host may be notified that the write operation has completed regardless, or independent, of whether the WP data has been flushed (e.g., written out to) non-volatile storage. In contrast to asynchronous writes are synchronous writes. In at least one embodiment in accordance with techniques herein, write data of a synchronous write may be stored in cache and marked as WP. The WP write data is then flushed to non-volatile storage and an acknowledgement regarding completion of the write is returned to the host or client only after flushing of the write data to non-volatile storage has been completed. As described in the '717 patent, cached WP data for file-based write I/Os is placed in internal I/O lists which were committed or flushed to the file system as stored on the non-volatile backend storage when specified conditions are met.

In at least one embodiment in accordance with techniques herein, each write to a specified block range of a file, such as for each synchronous write I/O, may result in creating a single I/O list. In other cases, such as with asynchronous writes, an I/O list may include generally one or more block ranges from one or more different asynchronous writes. Thus, in at least one embodiment, a single I/O list may include merged block ranges of a file written to by multiple asynchronous writes. Generally, a single I/O list may include one or more block ranges of one or more written I/Os as received from a client. Consider a specific exemplary case where multiple sequential write I/Os write to the same file, where such writes may be overlapping or conflicting in that each of the multiple writes write to at least one of the same file blocks as another one of the writes. In such a case as described in the '717 patent, range locks may be used to serialize access to a file in a file system such that concurrent I/Os may be performed to different regions of the same file. Cached write data of non-overlapping or non-conflicting write I/Os may be committed or flushed to non-volatile storage concurrently such that the data written to different non-overlapping regions of the same file I/Os may be performed concurrently. However, as described in the '717 patent, cached data associated with conflicting or overlapping write I/O requests (e.g., where the write I/Os write to at least one same block of the same file and thus have associated I/O lists sharing at least one same or common file block of the same file) is flushed in an ordered manner such as serially based on the sequence in which the write I/O requests have been issued by clients. Such sequential ordering (denoting a serialized sequential order in which the cached write I/O data of the different I/O lists is flushed or committed to the file system stored on non-volatile storage) when having multiple overlapping writes writing to the same file block is needed in order to maintain expected data integrity and avoid data corruption. Further, the I/O lists of the overlapping or conflicting write I/Os which are serialized may further cascade and include more than two lists for two conflicting or overlapping write I/Os which are flushed/committed sequentially to non-volatile storage. Such cascading, and more generally such required sequential ordering, adversely impacts performance. In contrast to the foregoing sequential non-concurrently committed, flushed I/O lists are the non-overlapping I/O lists that may be concurrently committed.

Techniques described in following paragraphs provide an improvement to the techniques described in the '717 patent in connection with the overlapping or conflicting I/O lists. In at least one embodiment in accordance with techniques herein, at least some of the overlapping or conflicting I/O lists of the sequence which are waiting to be flushed or committed to the file system stored on non-volatile storage may be reorganized or rearranged in a manner that reduces or eliminates the number of overlaps or conflicts. For a first I/O list of a sequence for which overlaps have been eliminated with respect to other I/O lists of the sequence, the first I/O list may be committed or flushed concurrently, rather than serially, with respect to other I/O lists of the sequence. Thus, the first I/O list may be committed or flushed in parallel, rather than serially, with respect to other I/O lists in the sequence thereby providing for improved performance in the data storage system.

At least one embodiment in accordance with techniques herein may use data structures, techniques, and the like, as described in the '717 patent, with the additional improvement as described herein performed on specified sequences of overlapping I/O lists.

Figure 2:
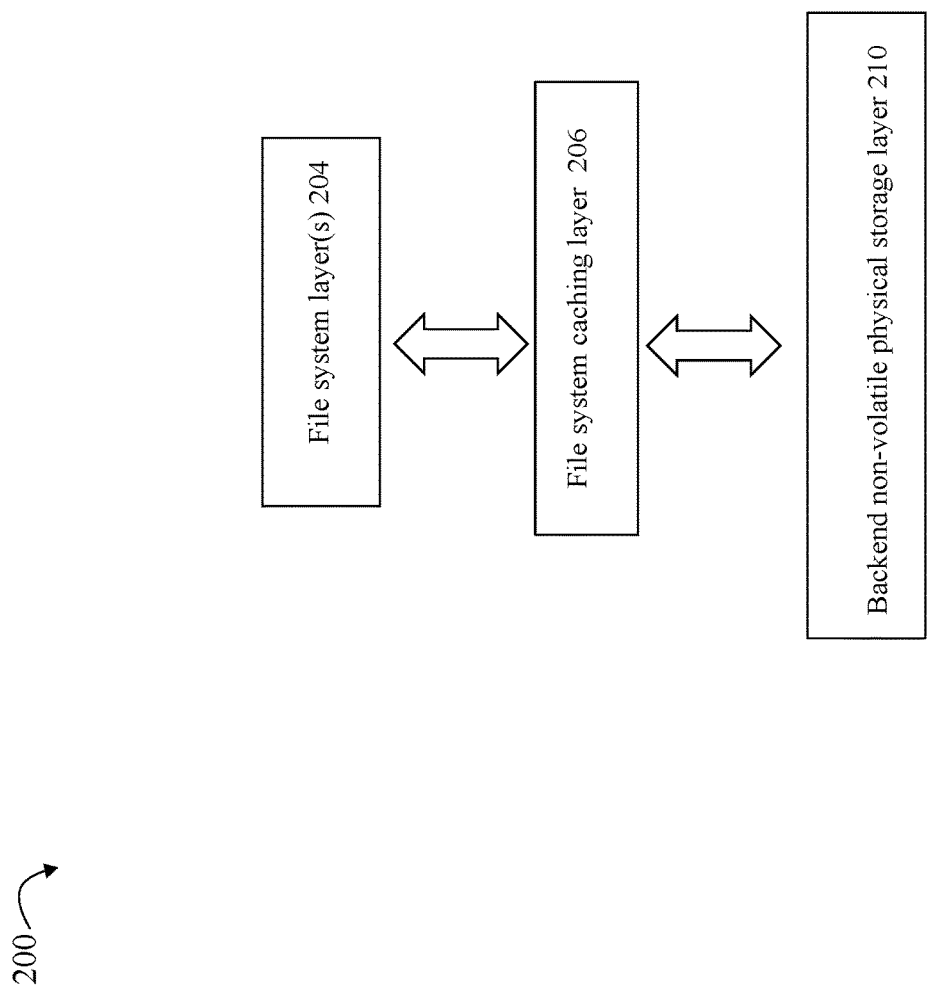
FIG. 2 is an example of layers that may be included in a data or I/O path in an embodiment in accordance with techniques herein.

Referring to FIG. 2, shown is an example 200 of layers that may be included in an I/O stack of the data or I/O path in an embodiment in accordance with techniques herein. The example 200 includes one or more file system layers 204, a file system caching layer 206 and back-end non-volatile storage layer 210. The data storage system may receive an I/O operation, such as a write I/O, issued by a client in accordance with a supported file system protocol of the data storage system. For example, the write I/O may be a filed-based write I/O in accordance with the NFS protocol. The write I/O may be processed in accordance with the data or I/O path of the example 200 including one or more file system layers 204 that may vary in accordance with the particular file-based protocol of the write I/O. The write I/O data may be stored in cache by the file system caching layer 206. In at least one embodiment in accordance with techniques herein, the cached write I/O data may be stored in an I/O list with an associated range lock indicating whether the range lock has been granted/acquired, or other whether the I/O list is waiting to acquire the necessary range lock, such as described in the '717 patent, and also described in more detail elsewhere herein. If the write I/O request is an asynchronous I/O request, an acknowledgement is returned to the client once the write data has been stored in the cache by layer 206. At some later point in time, the cached write data of the asynchronous write is committed or flushed from the cache to backend non-volatile storage by the back-end non-volatile physical storage layer 210. If the write I/O request is a synchronous I/O request, an acknowledgement is returned to the client once the write data has been stored on the backend non-volatile physical storage by layer 210. The return I/O or data path may include traversing the layers 210, 206 and 204 back up the call chain to return the acknowledgement, and any requested data (e.g., such as for a read I/O request), to the client.

At least one embodiment in accordance with techniques herein may use range locks as described in the '717 patent, or other suitable techniques, to ensure a desired level of access and control over regions (e.g., specified blocks) of a file. In at least one embodiment, a first set of first range locks may be used to control access to in-memory buffers or pages of the cache associated with regions (e.g., particular file blocks) to which data is written (e.g., by layer 206); and a second set of second range locks may be used to control access to the non-volatile storage locations at which an associated regions of the file are stored (e.g., by layer 210). In such an embodiment, multiple overlapping write I/O requests all targeting the same region of the file may each serially acquire necessary range locks associated with cache and non-volatile storage for the particular region. For example, assume first and second write I/Os both write to the same region of a file and exclusive access associated with locks is required in order to write to cache and also non-volatile physical storage associated with the region. If the first write I/O has acquired a first range lock providing exclusive access to the associated cache location, the second write I/O is blocked or waits until the first range lock is released and then similarly acquired by the second write I/O before proceeding to store the write data of the second write I/O in the associated cache location. In a similar manner, if the first write I/O has acquired a second range lock providing exclusive access to the associated non-volatile storage location for the region of the file, the second write I/O is blocked or waits until the second range lock is released and then acquired in a similar manner by the second write I/O before proceeding to store the write data of the second write I/O on the non-volatile storage location for the region of the file. Thus, the first range locks protects data written to an in-memory buffer of the file system cache, and the second range locks protects the flushed or committed file, and file system, data stored on non-volatile physical storage.

Figure 3:
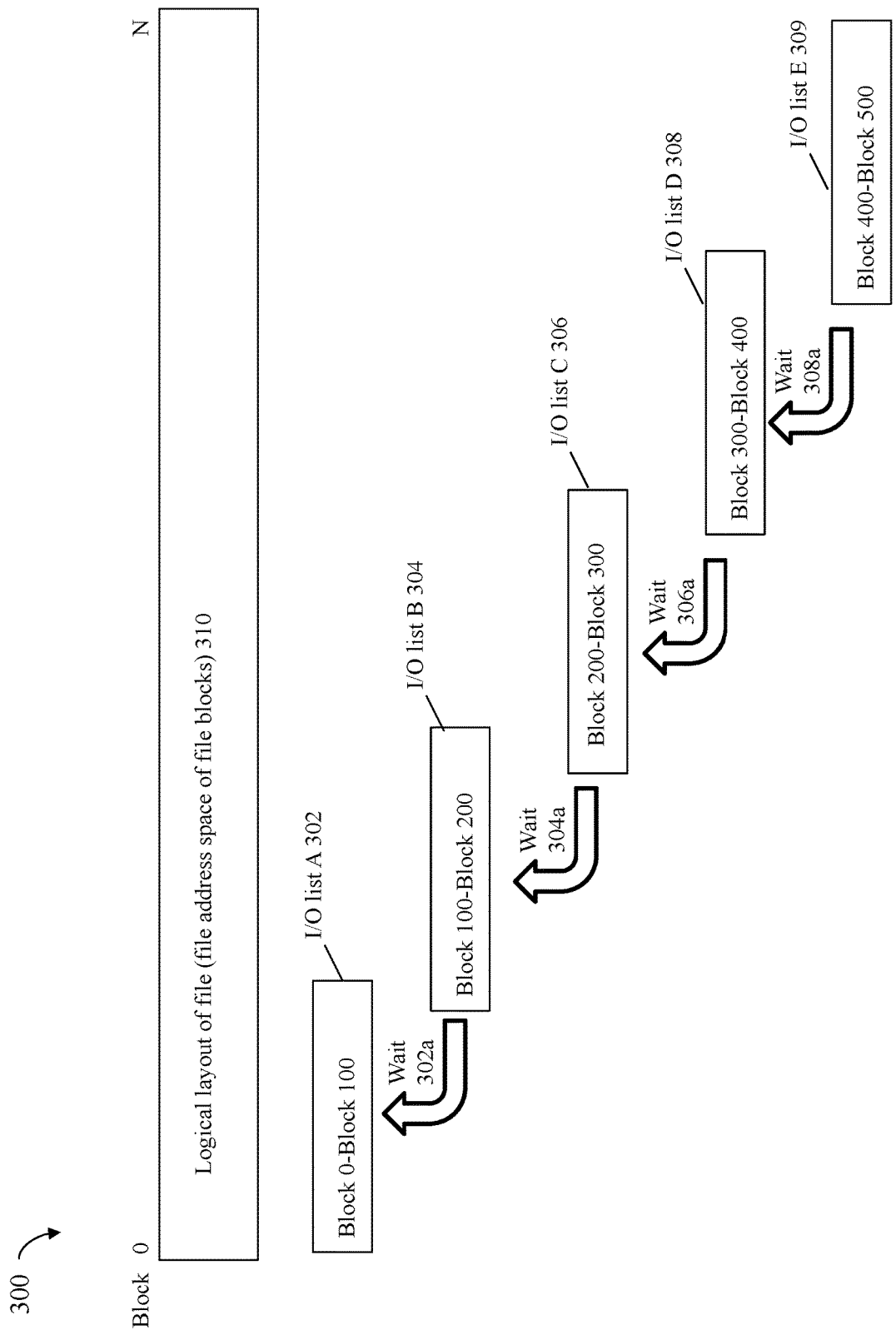
FIGS. 3, 4A, 4B, 5A and 5B are examples illustrating overlapping or conflicting I/O lists and associated reorganization and modification that may be in an embodiment in accordance with techniques herein.

Referring to FIG. 3, shown is an example 300 illustrating overlapping write I/O requests and associated I/O lists prior to processing in an embodiment in accordance with techniques herein. The example 300 includes a logical layout of a file 310 which denotes the logical file address space of blocks 0-N. In connection with an example illustrating use of techniques, reference is made to 5 I/O lists 302, 304, 306, 308 and 309 of FIG. 3. In this particular example as described below, each of the I/O lists may be created as a result of a single write I/O, as may be more typical in connection with synchronous write I/Os. Additionally, the write I/Os form a pattern known as sequential writes which write to sequential logical block ranges of the same file. Thus, this particular example includes characteristics particular to sequential synchronous write I/Os where there is a single write I/O per I/O list. However, as will be appreciated by those skilled in the art, techniques herein are not limited to the foregoing, or other particulars, of this example. More generally, techniques herein may be used in connection with I/O lists that include multiple block ranges from multiple writes (e.g., as may be typical of asynchronous write I/Os). It is not the case that techniques herein are limited to use with an I/O list for only a single write I/O. Rather, techniques herein are applicable for use in cases where an I/O list includes block ranges from multiple writes. Further, it is not the case that techniques herein are limited to use with sequential I/Os. Rather, techniques herein may be used with an I/O list including one ore multiple non-contiguous block ranges for one or more write I/Os. Further, techniques herein may be used in connection with both asynchronous and synchronous write I/Os.

Referring to FIG. 3 illustrating one particular example, assume that five write I/Os have, respectively, associated I/O lists A 302, B 304, C 306, D 308 and E 309. The five write I/O lists 302, 304, 306, 308 and 309 illustrate a write dependency of the cascading overlapping I/O lists. The 5 write I/Os may be, for example, 5 sequential write I/Os such as 5 sequential asynchronous write I/Os. I/O list A 302 is a write to blocks 0-100 of the file which may be in the process of being flushed or committed to non-volatile storage. While the I/O list A 302 is being flushed, 4 additional write I/Os having, respectively, associated I/O lists 304, 306, 308 and 309 may arrive at the data storage system. In this example, the 4 additional I/Os may arrive in the sequential ordering such that I/O list 304 is for the first additional I/O received, I/O list 306 is for the second additional I/O received, I/O list 308 is for the third additional I/O received, and I/O list 309 is for the fourth additional I/O received.

I/O list B 304 is determined as overlapping or conflicting with respect to I/O list A 302 where both I/O lists 302 and 304 have shared or common blocks by writing to the same block 100. Thus, the I/O list 304 must wait 302a until I/O list 302 has completed committing or flushing before commencing the flushing or committing of I/O list 304.

I/O list C 306 is determined as overlapping or conflicting with respect to I/O list B 304 where both I/O lists 304 and 306 have shared or common blocks by writing to the same block 200. Thus, the I/O list 306 must wait 304a until I/O list 304 has completed committing or flushing before commencing the flushing or committing of I/O list 306.

I/O list D 308 is determined as overlapping or conflicting with respect to I/O list C 306 where both I/O lists 306 and 308 have shared or common blocks by writing to the same block 300. Thus, the I/O list 308 must wait 306a until I/O list 306 has completed committing or flushing before commencing the flushing or committing of I/O list 308.

I/O list E 309 is determined as overlapping or conflicting with respect to I/O list D 308 where both I/O lists 308 and 309 have shared or common blocks by writing to the same block 400. Thus, the I/O list 309 must wait 308a until I/O list 308 has completed committing or flushing before commencing the flushing or committing of I/O list 309.

In one aspect, I/O lists 302, 304, 306, 308 and 309 illustrate a cascading affect where multiple conflicting I/O lists have a dependency ordering in accordance with the order in which the 5 associated writes I/Os are received. The multiple conflicting I/O lists as illustrated in FIG. 3 may be applied sequentially based on the order in which the 5 write I/Os are received.

As illustrated in the example 300 in at least one embodiment in accordance with techniques herein, the I/O lists may be sorted in block order, such as ascending block order based on the beginning or lowest numbered block of each I/O list.

Each of the I/O lists 302, 304, 306, 308 and 309 may denote a single contiguous logical block range of the same file for purposes of illustrating this particular example. However, more generally, each I/O list may include any one or more file blocks where all such file blocks may not form a single contiguous logical block range of the file and may denote any suitable number of file blocks written to. An I/O list may include, for example, multiple smaller subranges (each of which may be contiguous) but where the collective subranges may not form a contiguous range of blocks (e.g., may include blocks 2-8, 12-15, 20, 22 and 100-300 in a single I/O list for a single write I/O to the file). For example, in connection with multiple possibly non-sequential asynchronous writes, a single I/O list may accumulate block ranges from such multiple writes whereby the block ranges may appear on the I/O list in a sorted order as just noted.

Due to the overlapping or conflicting I/O lists 302, 304, 306, 308 and 309, I/O lists B 304, C 306, D 308 and E 309 may be determined in accordance with techniques as described in the '717 patent to commit serially in sequence as noted above. However, in accordance with techniques described herein, the overlapping or conflicting I/O lists 304, 306 and 308 may be further processed and modified so as to facilitate reducing or eliminating conflicts or overlaps of the I/O lists 304, 306, 308, 309. Such modification may be made to any of the lists 304, 306, 308 and 309 while the overlapping or conflicting I/O lists 304, 306, 308 and 309 are not being committed and are waiting for I/O list 302 to finish committing or flushing.

In at least one embodiment in accordance with techniques herein, any modifications made to I/O lists 304, 306, 308, 309 guarantees that after all the foregoing I/O lists are committed, the final content as stored on the non-volatile storage is correct. In this manner, any/all modifications made to the I/O lists maintain and preserve data consistency of the contents of the file as stored on the non-volatile storage. For example, the final content as stored on the non-volatile storage after committing all I/O lists 304, 306, 308, 309 are correct (e.g., is the same data content or result as would have otherwise been obtained if such modifications had not been made to the I/O lists of FIG. 3 and if the original I/O lists had been committed based on the illustrated sequential ordering of FIG. 3). In connection with a modification that purges or removes a write to a particular block from a particular I/O list, techniques herein ensure that no client is waiting on a commit or flush for the particular I/O list (e.g., or any portion of a block range thereof) whereby the client expects the non-volatile storage for the particular block to have a particular value after the commit or flush has completed and that all writes to blocks of a particular original I/O list have been committed. The foregoing and other aspects of techniques herein are described in more detail in following paragraphs.

In connection with the example 300 of FIG. 3, since commitment or flushing of both I/O lists B 304 and C 306 has not yet begun, processing may be performed to modify or reorganize such lists. In accordance with techniques herein, reference is made to the example 400 of FIG. 4A where a first modification is made and illustrated to remove (e.g., cut or purge) the write to block 200 from I/O list C 306 and merge it into I/O list B 304.

Figure 4A:
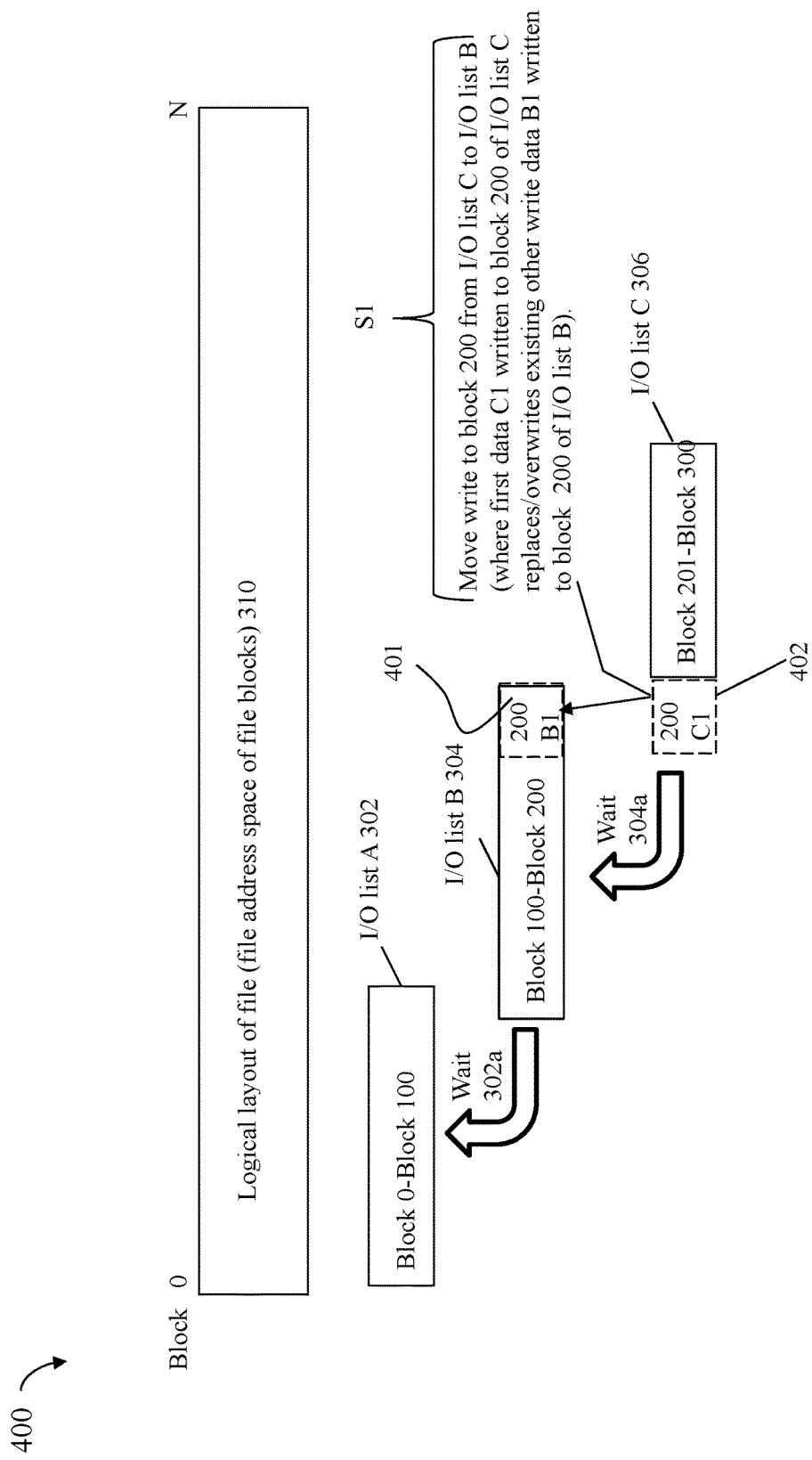

Referring to FIG. 4A, assume that B1 (401) denotes the data written to block 200 by I/O list B 304, and C1 (402) denotes the data written to block 200 by I/O list C 306. In accordance with techniques herein, assuming no client is waiting on a commit to the non-volatile storage of the modified or cut I/O list C 306, processing may be performed in step S1 to move the write to block 200 from I/O list C to I/O list B. S1 includes applying the data C1 written to block 200 in I/O list C 306 to block 200 in I/O list B 304 thereby overwriting or replacing the existing data B1 (for block 200 in I/O list B) with C1. S1 further includes removing the conflicting or overlapping data block 200 from the I/O list C 306 since its data content C1 is now merged into I/O list B 304. In this manner, the 2 conflicting writes to block 200 from I/O list B 304 and C 306 have been reduced or merged to the single resulting write to block 200 of data content C1 from I/O list C 306 where such single resulting write of C1 to block 200 is further now included only in the I/O list B 304.

Figure 4B:
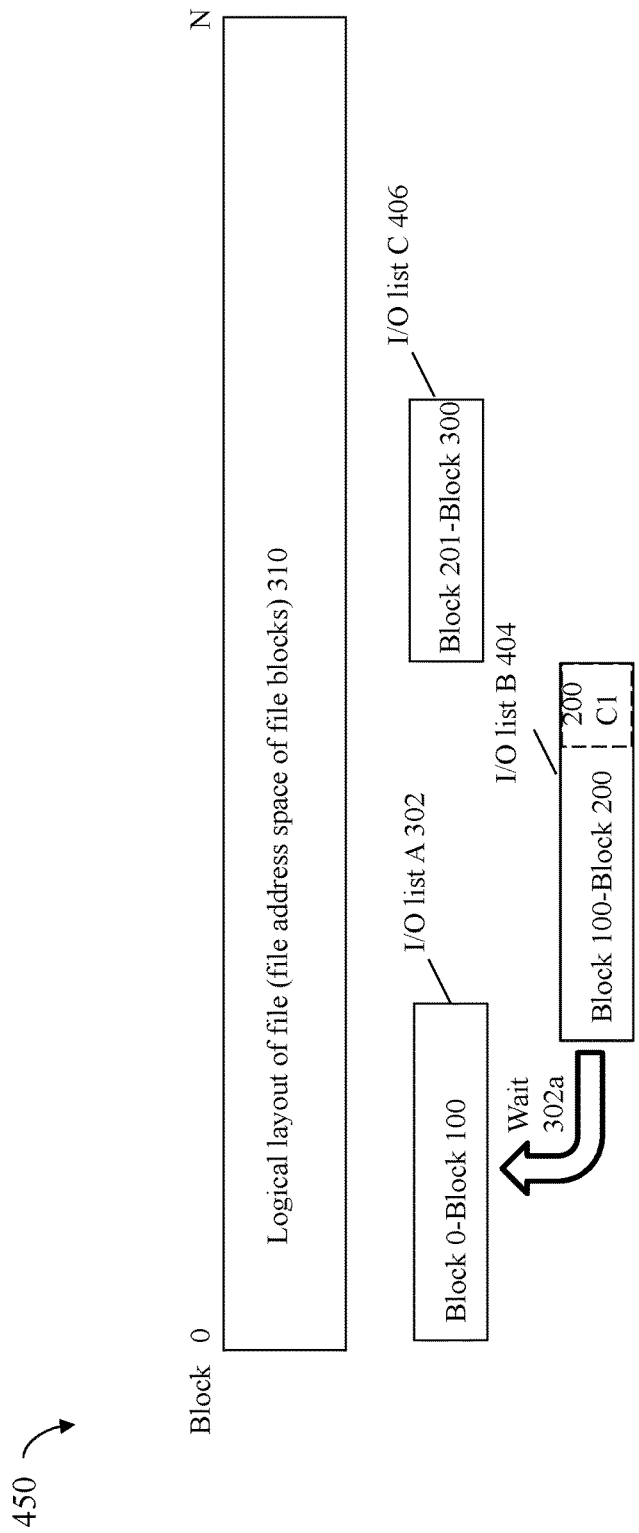

In this manner, reference is now made to the example 450 of FIG. 4B illustrating the resulting merged conflicting writes to block 200 and the removal of the conflicting block 200 from the I/O list C 306 (e.g., latter occurring I/O block in the sequence). Element 404 denotes the resulting modified I/O list B that has been modified from that as illustrated in 304 of FIG. 3. Elements 304 and 404 may denote the same I/O list B with the modification or difference that the write to block 200 in element 404 writes data content C1, rather than B1 (as in 304). Element 406 denotes the resulting modified I/O list C that has been modified from that as illustrated in 306 of FIG. 3. Elements 306 and 406 may denote the same I/O list C with the modification or difference that the I/O list 306 (prior to modification) writes to blocks 200-300, and that the I/O list C 406 (after modification) writes to blocks 201-300 (where conflicting block 200 is removed or cut from I/O list C 406).

As noted elsewhere herein, removal of the write to block 200 from I/O list C 306 may be performed only if there is no client waiting on a commit or flush of I/O list C 306 (e.g., or more generally waiting for a commit of the block range, or portion thereof, associated with I/O list E 309). For example, removal of the write to block 200 from I/O list C 306 may be performed only if there is no client waiting for a return acknowledgement on a commit or flush of I/O list C 306 (e.g., cannot perform removal of block 300 from I/O list C 306 resulting in modified I/O list C 406 if the write I/O corresponding to I/O list C is a synchronous write). If the client had issued a synchronous write that writes to block 200-300 of the file as denoted by I/O list C 306, an acknowledgement regarding completion of the write would be returned to the client once the write data written to blocks 200-300 has been committed or flushed from cache to non-volatile storage. However, if the above-noted modification removed block 200 from I/O list C 306, commitment or flushing of modified I/O list C 406 actually only commits blocks 201-300. In this case, there is no existing single I/O list that includes all the blocks 200-300 committing the actual write data of the synchronous write I/O.

It should also be noted that, in order to maintain data consistency and integrity in the case of an intervening system crash, making a similar change in a reverse direction from that as denoted in FIGS. 4A and 4B cannot be performed. For example, what cannot be performed is where the tail item of I/O list B 304 for block 200 is removed (changing I/O list B 304 to write blocks 100-199) and no modification is made to original I/O list C 306 (since the data content C1 written to block 200 by I/O list C 306 overwrites the B1 of block 200 of I/O list B 304). Such a modification may not be considered safe and may lead to data corruption/data inconsistency for the data stored at block 200 upon the occurrence of a system crash after committing I/O list B for blocks 100-199. In this case, the resulting data stored at block 200 may be in an inconsistent state due to the incomplete application of the write I/O for only blocks 100-199 without the additional data content B1 being flushed to block 200. In at least one embodiment, processing may be performed to maintain data consistency whereby in the event of a system crash, the data is in a state where either all of the write data for a write I/O has been applied or none has been applied. In this case, such a data consistency rule has been violated by only partially committing the write I/O data to blocks 100-199 and excluding the write to block 200.

Now, referring back to FIG. 4B, since the I/O list C 406 does not have any overlap or conflicts with any other I/O list (e.g., such as I/O lists A 302 and B 304), the I/O list C may be committed or flushed concurrently such as in parallel with the committing of I/O list A 302 (e.g., committing or flushing of I/O list C may commence prior to completing committing of flushing of I/O list A).

Figure 5A:
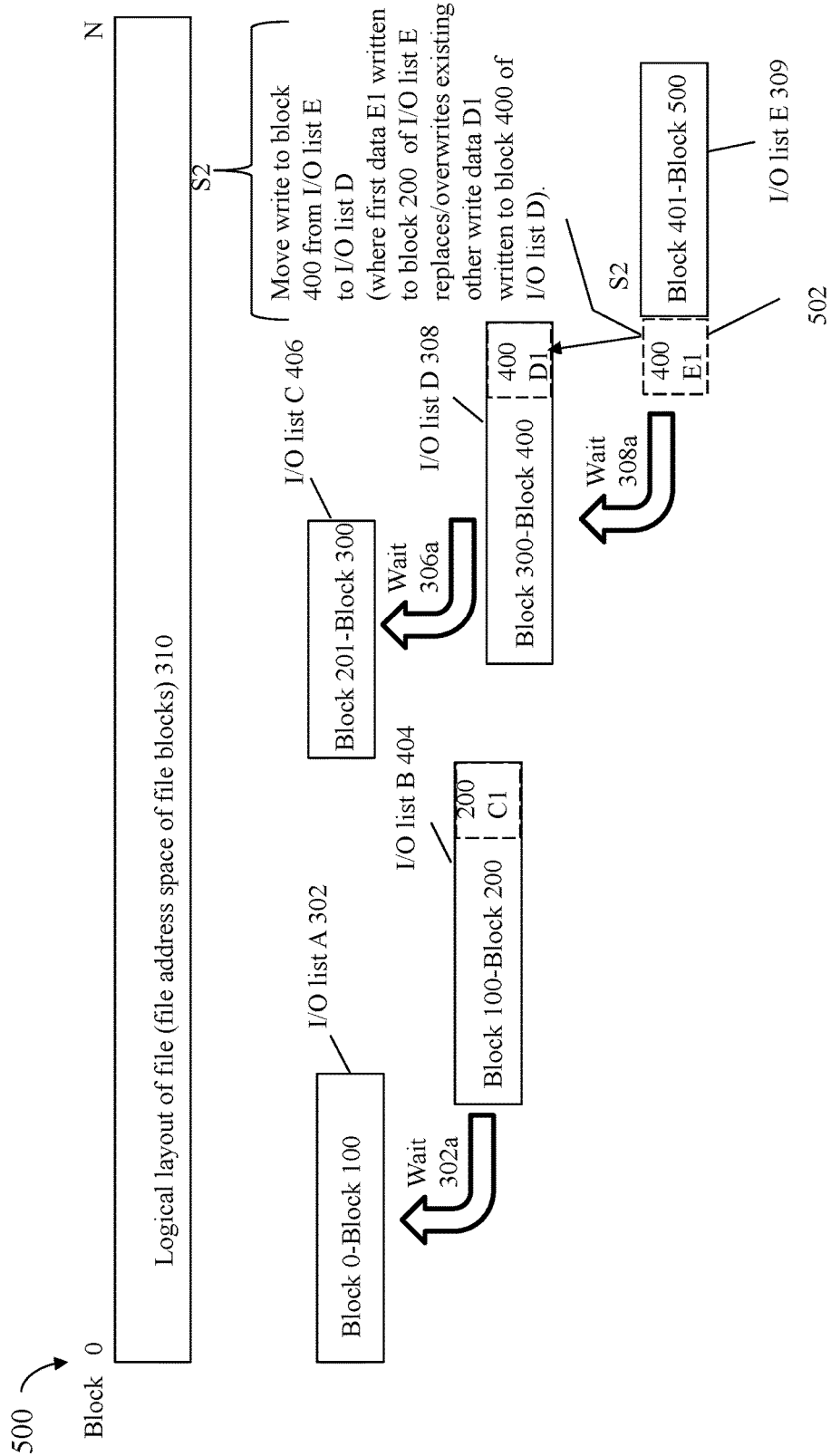

Continuing with this example and referring to FIG. 5A, shown is updated example 500 illustrating processing of committing or flushing I/O lists where I/O lists A 302 and modified I/O list C 406 are committing or flushing concurrently. Since both I/O lists D 308 and E 309 are not being committed (whereby I/O list D 308 is waiting 306a for I/O list C to commit since I/O lists 406 and 308 overlap or conflict; and wherein I/O list E 309 is waiting 308a for I/O list D 308 to commit since I/O lists 308 and 309 overlap) processing may be performed to modify or reorganize such lists 308, 309. In accordance with techniques herein, reference is made to the example 500 of FIG. 5A where a modification is made and illustrated to remove or cut the write to block 400 from I/O list E 309 and merge it into I/O list D 308.

Assume that D1 denotes the data written to block 400 by I/O list D 308, and E1 denotes the data written to block 400 by I/O list E 309. In accordance with techniques herein, assuming no client is waiting on a commit to the non-volatile storage of the modified or cut I/O list E 309 (e.g., or more generally waiting for a commit of the range associated with I/O list E 309), processing may be performed in step S2 to move the write of E1 to block 400 from I/O list E to I/O list D. S2 includes applying the data E1 written to block 400 in I/O list E 309 to block 400 in I/O list D 308 thereby overwriting or replacing the existing data D1 written to block 200 in I/O list D. S2 further includes removing the conflicting or overlapping data block 400 from the I/O list E 309 since its data content E1 is now merged into I/O list D 308. In this manner, the 2 conflicting writes to block 400 from I/O list D 308 and E 309 have been reduced or merged to the single resulting write to block 400 of data content E1 from I/O list E 309 where such single resulting write of E1 to block 400 is further now included only in the I/O list D 308.

Figure 5B:
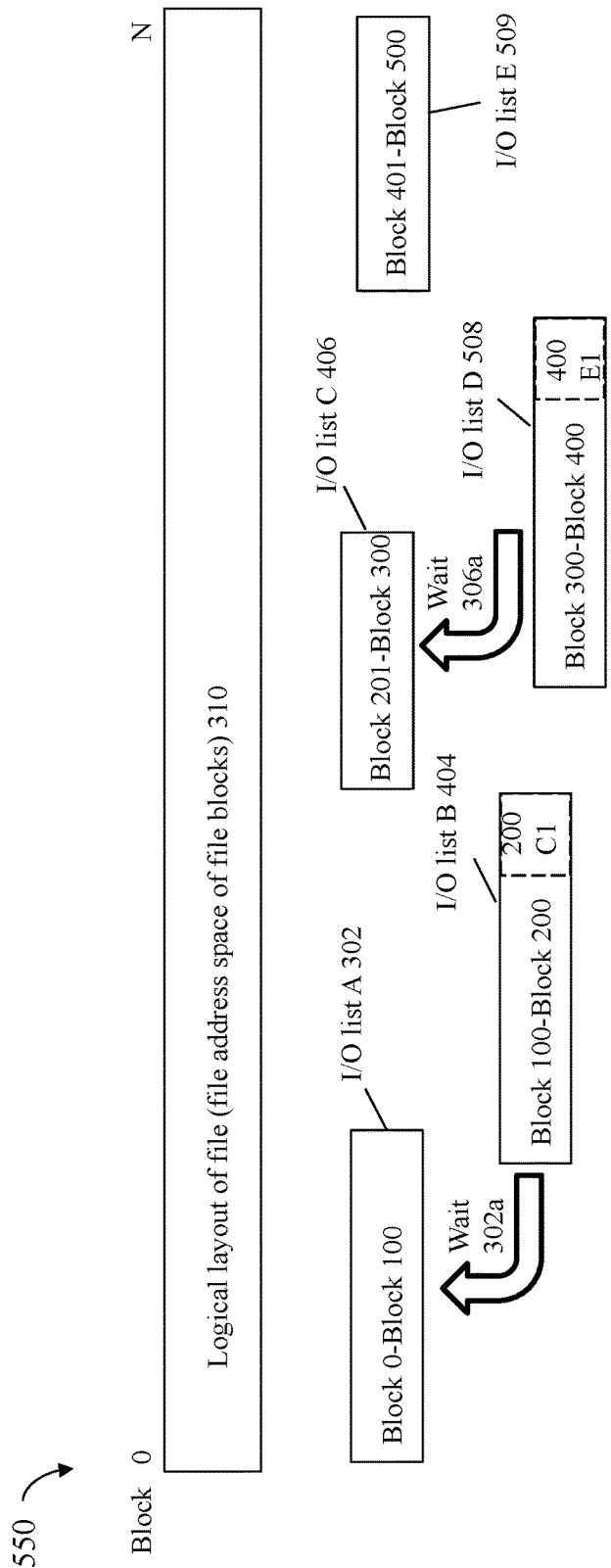

In this manner, reference is now made to the example 550 of FIG. 5B illustrating the resulting merged conflicting writes and the removal of the conflicting data block 400 from the I/O block E (e.g., latter occurring I/O block in the sequence). Element 508 denotes the resulting modified I/O list D that has been modified from that as illustrated in 308 of FIGS. 3 and 4A. Elements 308 and 508 may denote the same I/O list D with the modification or difference that the write to block 400 in the modified I/O list D 508 writes data content E1, rather than D1 (as in 308). Element 509 denotes the resulting modified I/O list E that has been modified from as illustrated in 309 of FIGS. 3 and 4A. Elements 309 and 509 may denote the same I/O list E with the modification or difference that the I/O list E 309 (prior to modification) writes to blocks 400-500, and that the modified I/O list E 509 (after modification) writes to blocks 401-500 (where conflicting block 400 is removed from I/O list E 509).

Now, since the I/O list E 509 does not have any overlap or conflicts with other I/O lists, the I/O list E 509 may be committed or flushed concurrently, for example, such as in parallel with the committing of I/O list A 302 and also in parallel with committing of I/O list C 406.

In at least one embodiment in accordance with techniques herein, a client issuing the file-based write I/Os and data storage system may have the same block write granularity such as 8K block writes. As a variation, the client and data storage system may have different block write level granularities. For example the data storage system write granularity may be larger than client granularity (e.g., data storage system block size write granularity may be twice the size of the client block size write granularity). For example, the client may perform writes in 4K blocks and the data storage system may have a write granularity of 8K blocks. The client may, for example, issue 2 writes to 2 different, consecutive 4K file blocks where each of the 2 writes may be on 2 different I/O lists. Further, the 2 consecutive 4K block written to may map to the same single 8K data storage system block, whereby the 2 different I/O lists are determined to have overlapping or conflicting writes to the same single 8K data storage system block. In such a case, processing may be performed as described above to modify the 2 different I/O lists thereby removing the conflict where the 2 different I/O lists may be flushed or committed concurrently. The foregoing highlights another use case and advantage that may be obtained using techniques herein to remove overlapping or conflicting I/Os.

What will now be described are flowcharts summarizing processing as described above that may be performed in an embodiment in accordance with techniques herein.

Figure 6:
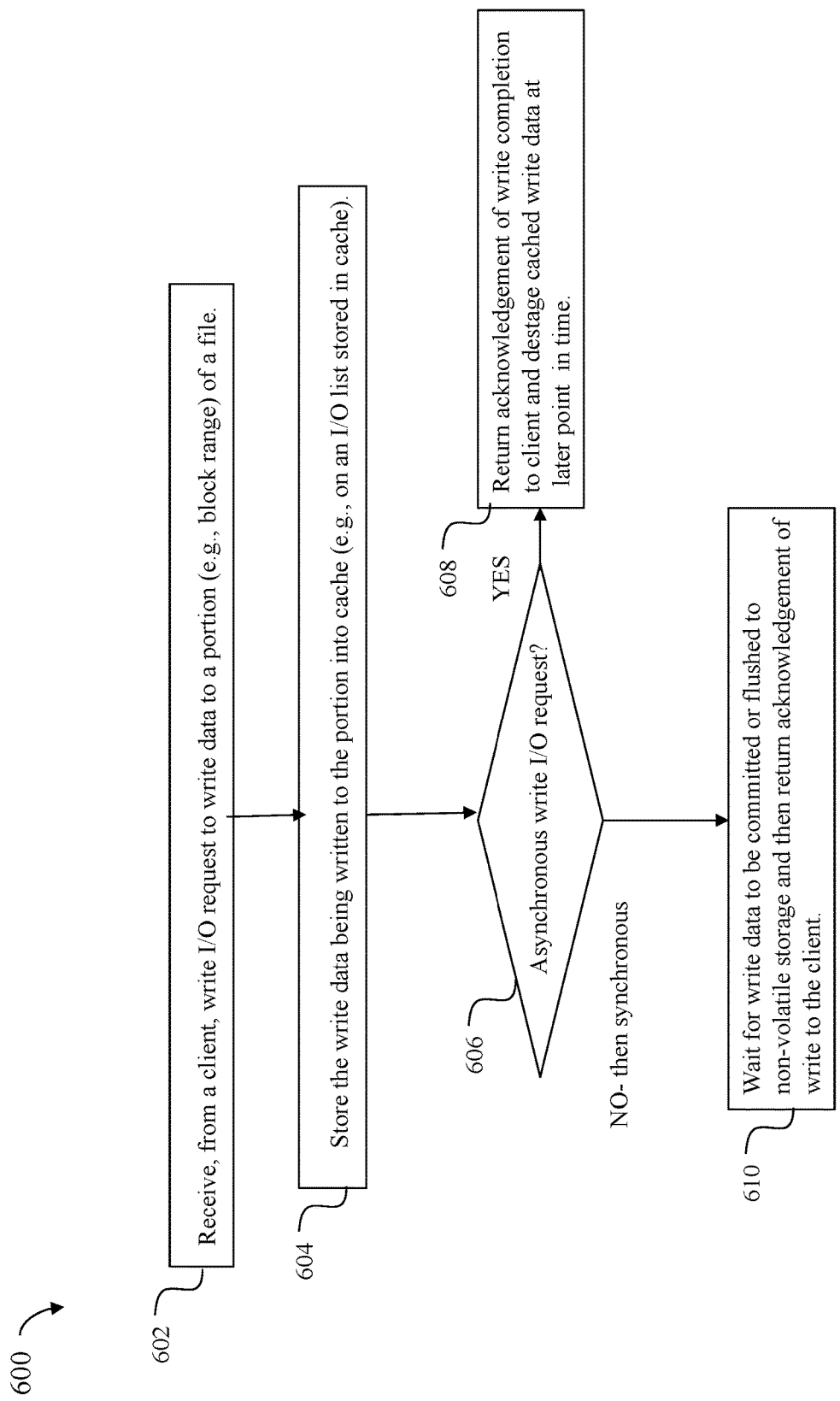
FIGS. 6 and 7 are flowcharts of processing steps that may be performed in an embodiment in accordance with techniques herein.

Referring to FIG. 6, shown is a first flowchart 600 of processing steps that may be performed in an embodiment in accordance with techniques herein. At step 602, a write I/O request may be received by a client where the write I/O is a request to write data to a portion (e.g., block range) of a file. From step 602, control proceeds to step 604. At step 604, the write data being written by the received write I/O is stored into cache, such as an I/O list stored in an in-memory cache buffer. From step 604, control proceeds to step 606 where a determination is made as to whether the write I/O request received in step 602 is an asynchronous write request. If step 606 evaluates to yes (e.g., asynchronous), control proceeds to step 608 to return and acknowledgement regarding completion of the write to the client and commit/flush the cached write data to the file/file system stored on the non-volatile storage at a later point in time. If step 606 evaluates to no (e.g., synchronous), control proceeds to step 610 to wait for the write data to be committed or flushed from cache to non-volatile storage and then return and acknowledgement of the write to the client.

Figure 7:
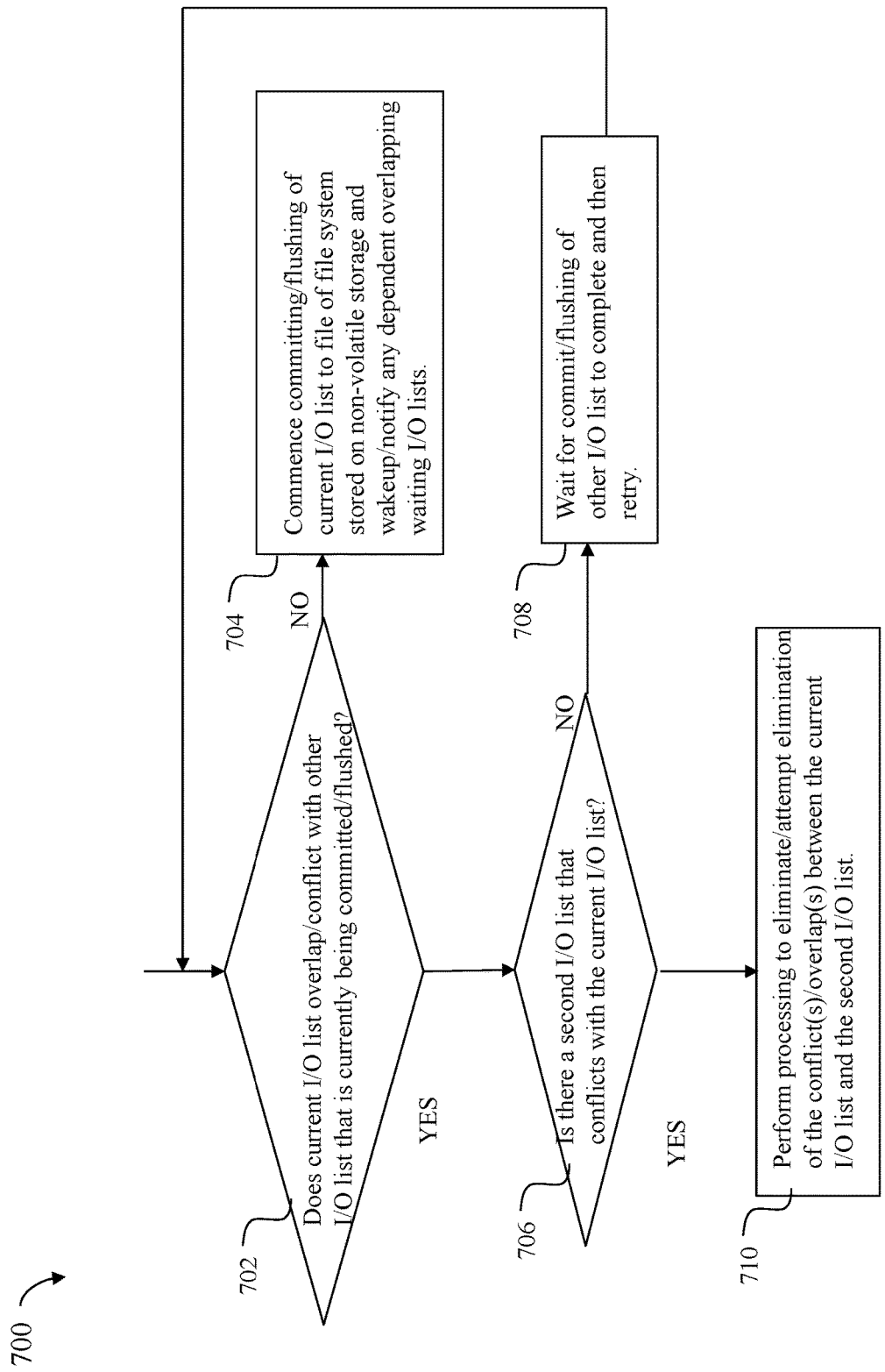

Referring to FIG. 7, shown is a second flowchart 700 of processing steps that may be performed in an embodiment in accordance with techniques herein. Flowchart 700 is processing that may be performed on a sequence of multiple conflicting or overlapping I/O lists such as the cascading sequence of I/O lists of FIG. 3. In particular, step 710 of flowchart 700 described below includes processing that may be performed as described herein, such as in connection with FIGS. 4A, 4B, 5A and 5B, that attempt to eliminate existing conflicts or overlaps between two conflicting/overlapping I/O lists so that one or more of such I/O lists may be committed concurrently with one or more other non-overlapping/non-conflicting I/O lists. Without processing of flowchart 700, the sequence of multiple conflicting I/O lists such as in FIG. 3 may be performed serially based on the defined ordering of the sequence.

In connection with the sequence such as in FIG. 3, the next or current I/O list, such as I/O list A 302, is processed in connection with step 702. At step 702, a determination is made as to whether the current I/O list overlaps or conflicts with another I/O list that is currently being committed/flushed. For example, since I/O list A 302 is the first I/O list of the sequence, processing of step 702 may evaluate to no since no such other conflicting I/O list is being committed, and control proceeds to step 704. At step 704, processing is performed to commence committing/flushing of the current I/O list (e.g., I/O list A 302) to the file of the system storage on non-volatile storage. Subsequently, once the current I/O list has been committed, processing is then performed in step 702 to wake up or notify any dependent overlapping waiting I/O lists. As described above, there may be one or more I/O lists that conflict with the current I/O list and have been waiting in accordance with the defined sequential ordering of the sequence to commence flushing. As such, once the current I/O has been committed, the next waiting overlapping I/O list may be awakened to proceed with its flushing.

If step 702 evaluates to yes, whereby the current I/O list overlaps/conflicts with another I/O list current being committed/flushed, processing proceeds to step 706. Step 702 may evaluate to yes, for example, in connection with processing I/O list B 304 as the current list. In this case, processing proceeds from step 702 to step 706 where a determination is made as to whether there is a second I/O list (such as included in the sequence) that conflicts with the current I/O list. For example, with reference to step 706 and I/O list B 304 as the current I/O list, step 706 evaluates to yes where the I/O list C 306 is determined as the second list that conflicts with the current list, I/O list B 304.

If step 706 evaluates to yes, control proceeds to step 710. In step 710 processing may be performed that eliminates/attempts elimination of the conflict/overlap between the current I/O list (e.g., I/O list B 304) and the second I/O list (I/O list C 306). Processing of step 710 as may be performed in an embodiment in accordance with techniques herein is described above, for example, with reference to FIGS. 4A and 4B. In connection with step 710, for example, the second I/O list, I/O list C 306, may have conflicting block 200 removed or cut. Further, the data content C1 written to the conflicting and removed block 200 by I/O list C 306 is merged with the current I/O list, I/O list B 304 (where C1 overwrites any content of block 200 currently stored in I/O list B 304). As a result, the I/O list C from which the conflicting block has been removed may be committed/flushed concurrently (e.g., in parallel) with respect to flushing of other non-conflicting I/O lists, such as I/O list A 302.

If step 706 evaluates to no (such as if the sequence of I/O lists only included I/O lists A 302 and B 304), control proceeds to step 708 to wait for commit/flushing of the other I/O list to complete. Once it completes, processing is performed with respect to the other I/O list to retry commit processing where control proceeds from step 708 to step 702. It should be noted that there may be multiple waiters/waiting I/O lists that overlap with the other I/O list currently being committed. As such, processing as described in connection with step 708 proceeding to step 702 allows for the possibility that any one of the multiple waiters may commence flushing once the other I/O list has been committed.

Although not explicitly mentioned in connection with FIG. 7 processing but discussed elsewhere herein, step 710 processing may include ensuring that the second I/O list, I/O list C is both subsequent to the current I/O list in the sequence (received later in time than the current I/O list) and also ensure that no client is waiting on a commit for I/O list C (or portion of block(s) or block ranges of list C). Additionally, although not specifically mentioned, processing of FIGS. 6 and 7 may include use of range locks or other suitable mechanisms that may be used to provide desired levels of access and control synchronizing cache accesses, the flushing to common portions of the file stored on non-volatile storage, and the like.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method of managing concurrent I/Os in a file system comprising:
   receiving a sequence including a plurality of I/O lists of write data stored in a cache, wherein each I/O list of the sequence conflicts with at least one other I/O list of the sequence, wherein the sequence specifies a sequential order of the plurality of I/O lists corresponding to a dependency order in which a plurality of write I/O operations are received, wherein the plurality of write operations write the write data of the plurality of I/O lists to a file stored on non-volatile storage;
   determining a first I/O list of the sequence having a first conflict with a second I/O list of the sequence, wherein the first I/O list includes write data of a first write of the plurality of write operations and the second I/O list includes write data of a second write of the plurality of write I/O operations, and wherein the first conflict between the first I/O list and the second I/O list includes one or more common blocks included in both the first I/O list and the second list, and wherein data is written by both the first write and the second write to the one or more common blocks, wherein the first I/O list occurs in the sequence prior to the second I/O list, and wherein the second write is received after the first write; and
   performing first processing that modifies the first I/O list and the second I/O list to remove the first conflict, wherein the second I/O list includes one or more data values written to the one or more common blocks by the second write and the first processing comprises:
      eliminating the one or more common blocks from the second I/O list; and
      merging the one or more data values from the second I/O list with the first I/O list.

2. The method of claim 1, wherein the first processing is performed prior to commencing flushing of the first I/O list and the second I/O list and while each of the first and the second I/O lists are waiting for at least one other I/O list to be flushed to the file stored on the non-volatile storage.

3. The method of claim 2, wherein a third I/O list of the sequence conflicts with the first I/O list, the third I/O list includes write data of a third write, and the first I/O list waits for the third I/O list to complete flushing to the file stored on the non-volatile storage prior to commencing flushing of the first I/O list.

4. The method of claim 3, wherein the first write is received prior to the second write, and the third write is received prior to the first write, and wherein the sequential order of the sequence indicates a dependency ordering of the third I/O list, the first I/O list and then the second I/O list corresponding, respectively, to a receiving order of the third write, the first write and the second write.

5. The method of claim 4, wherein the first I/O list includes a second one or more data values written to the one or more common blocks, and wherein said merging includes overwriting the second one or more data values of the first I/O list with the one or more data values of the second I/O list.

6. The method of claim 5, wherein prior to performing said first processing, the method includes performing processing comprising:
determining that no client is waiting for a commit that the second I/O list, or any portion thereof, has been flushed to the file stored on the non-volatile storage; and
responsive to determining no client is waiting for a commit that the second I/O list or any portion thereof, has been flushed to the file stored on the non-volatile storage, determining to perform said first processing.

7. The method of claim 5, wherein after performing said first processing whereby the first conflict between the first I/O list and the second I/O list is removed, and wherein the second I/O list does not conflict with the third I/O list, the method includes performing processing comprising:
concurrently flushing the second I/O list and the third I/O list to the file stored on the non-volatile storage.

8. The method of claim 7, wherein the second I/O list is flushed to the file stored on the non-volatile storage in parallel with flushing the third I/O list to the file stored on the non-volatile storage.

9. The method of claim 1, wherein each of the first write and the second write is either an asynchronous or a synchronous write request issued by a client.

10. A system comprising:
at least one processor; and
a memory comprising code stored thereon that, when executed, performs a method of managing concurrent I/Os in a file system comprising:
receiving a sequence including a plurality of I/O lists of write data stored in a cache, wherein each I/O list of the sequence conflicts with at least one other I/O list of the sequence, wherein the sequence specifies a sequential order of the plurality of I/O lists corresponding to a dependency order in which a plurality of write I/O operations are received, wherein the plurality of write operations write the write data of the plurality of I/O lists to a file stored on non-volatile storage;
determining a first I/O list of the sequence having a first conflict with a second I/O list of the sequence, wherein the first I/O list includes write data of a first write of the plurality of write operations and the second I/O list includes write data of a second write of the plurality of write I/O operations, and wherein the first conflict between the first I/O list and the second I/O list includes one or more common blocks included in both the first I/O list and the second list, and wherein data is written by both the first write and the second write to the one or more common blocks, wherein the first I/O list occurs in the sequence prior to the second I/O list, and wherein the second write is received after the first write; and
performing first processing that modifies the first I/O list and the second I/O list to remove the first conflict, wherein the second I/O list includes one or more data values written to the one or more common blocks by the second write and the first processing comprises:
eliminating the one or more common blocks from the second I/O list; and
merging the one or more data values from the second I/O list with the first I/O list.

11. A non-transitory computer readable medium comprising code stored thereon that, when executed, performs a method of managing concurrent I/Os in a file system comprising:
receiving a sequence including a plurality of I/O lists of write data stored in a cache, wherein each I/O list of the sequence conflicts with at least one other I/O list of the sequence, wherein the sequence specifies a sequential order of the plurality of I/O lists corresponding to a dependency order in which a plurality of write I/O operations are received, wherein the plurality of write operations write the write data of the plurality of I/O lists to a file stored on non-volatile storage;
determining a first I/O list of the sequence having a first conflict with a second I/O list of the sequence, wherein the first I/O list includes write data of a first write of the plurality of write operations and the second I/O list includes write data of a second write of the plurality of write I/O operations, and wherein the first conflict between the first I/O list and the second I/O list includes one or more common blocks included in both the first I/O list and the second list, and wherein data is written by both the first write and the second write to the one or more common blocks, wherein the first I/O list occurs in the sequence prior to the second I/O list, and wherein the second write is received after the first write; and
performing first processing that modifies the first I/O list and the second I/O list to remove the first conflict, wherein the second I/O list includes one or more data values written to the one or more common blocks by the second write and the first processing comprises:
eliminating the one or more common blocks from the second I/O list; and
merging the one or more data values from the second I/O list with the first I/O list.

12. The non-transitory computer readable medium of claim 11, wherein the first processing is performed prior to commencing flushing of the first I/O list and the second I/O list and while each of the first and the second I/O lists are waiting for at least one other I/O list to be flushed to the file stored on the non-volatile storage.

13. The non-transitory computer readable medium of claim 12, wherein a third I/O list of the sequence conflicts with the first I/O list, the third I/O list includes write data of a third write, and the first I/O list waits for the third I/O list to complete flushing to the file stored on the non-volatile storage prior to commencing flushing of the first I/O list.

14. The non-transitory computer readable medium of claim 13, wherein the first write is received prior to the second write, and the third write is received prior to the first write, and wherein the sequential order of the sequence indicates a dependency ordering of the third I/O list, the first I/O list and then the second I/O list corresponding, respectively, to a receiving order of the third write, the first write and the second write.

15. The non-transitory computer readable medium of claim 14, wherein the first I/O list includes a second one or more data values written to the one or more common blocks, and wherein said merging includes overwriting the second one or more data values of the first I/O list with the one or more data values of the second I/O list.

16. The non-transitory computer readable medium of claim 15, wherein after performing said first processing whereby the first conflict between the first I/O list and the second I/O list is removed, and wherein the second I/O list does not conflict with the third I/O list, the method further comprising:

concurrently flushing the second I/O list and the third I/O list to the file stored on the non-volatile storage.

\* \* \* \* \*